US008408110B2

(12) United States Patent
Krauss et al.

(10) Patent No.: US 8,408,110 B2
(45) Date of Patent: Apr. 2, 2013

(54) FLATBED PUNCHING MODULE FOR PUNCHING A PRINTING MATERIAL AND FLATBED PUNCH

(75) Inventors: Joachim Krauss, Pfungstadt/Hahn (DE); Georg Meissner, Luhe-Wildenau (DE); Harald Rau, Trabitz (DE); Hans Schadl, Hirschau (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 603 days.

(21) Appl. No.: 12/354,941

(22) Filed: Jan. 16, 2009

(65) Prior Publication Data

US 2009/0183616 A1 Jul. 23, 2009

(30) Foreign Application Priority Data

Jan. 18, 2008 (DE) ........................ 10 2008 005 214

(51) Int. Cl.
*B23D 25/00* (2006.01)
*B26F 1/14* (2006.01)

(52) U.S. Cl. ............................ 83/436.9; 83/685; 83/821

(58) Field of Classification Search .................... 83/202, 83/212.1, 225, 226, 236, 257, 267, 401, 438, 83/436.9, 531, 533, 652, 821, 825, 826, 684, 83/685, 686–691
See application file for complete search history.

(56) References Cited

U.S. PATENT DOCUMENTS

| | | | | | |
|---|---|---|---|---|---|
| 104,637 | A | * | 6/1870 | Palmer | 83/425.3 |
| 1,469,245 | A | * | 10/1923 | Baxter | 83/416 |
| 2,108,447 | A | * | 2/1938 | Rosenberg | 83/31 |
| 2,386,147 | A | * | 10/1945 | Sidebotham | 83/40 |
| 2,653,661 | A | * | 9/1953 | Burns | 83/227 |
| 2,788,069 | A | * | 4/1957 | Wiklund et al. | 83/29 |
| 2,789,640 | A | * | 4/1957 | Belden | 53/435 |
| 3,045,519 | A | * | 7/1962 | Sarka | 83/157 |
| 3,465,958 | A | * | 9/1969 | Gunderson et al. | 234/108 |
| 3,561,308 | A | * | 2/1971 | Ehrlich | 83/214 |
| 3,570,344 | A | * | 3/1971 | Bryson et al. | 83/155 |
| 3,688,622 | A | * | 9/1972 | Wahnschaff | 83/88 |
| RE29,795 | E | * | 10/1978 | Eyberger | 83/245 |

(Continued)

FOREIGN PATENT DOCUMENTS

| | | | |
|---|---|---|---|
| DE | 36 28 620 | A1 | 1/1987 |
| DE | 10 2004 012 694 | A1 | 10/2005 |
| DE | 20 2007 012 356 | U1 | 11/2007 |

OTHER PUBLICATIONS

German Patent and Trademark Office Search Report, dated Oct. 6, 2008.

*Primary Examiner* — Sean Michalski
(74) *Attorney, Agent, or Firm* — Laurence A. Greenberg; Werner H. Stemer; Ralph E. Locher

(57) ABSTRACT

A flatbed punching module for punching a printing material includes an upper platen and a lower platen which can be moved by a drive relative to the upper platen that is fixed to a frame, in order to perform a punching stroke for punching the printing material passing between the upper platen and the lower platen, resulting in the lower platen engaging with or being thrown onto the upper platen. As a result, the printing material can be processed through the use of at least one punching die. At least one printing material transport device for guiding the printing material, is held fixedly on the movable lower platen. The flatbed punching module can advantageously be used in a flatbed punch for processing a printing material web.

17 Claims, 3 Drawing Sheets

U.S. PATENT DOCUMENTS 4,138,913 A * 2/1979 Gentile ........ 83/236
4,173,161 A * 11/1979 Arends et al. ........ 83/278
4,187,750 A * 2/1980 Ito et al. ........ 83/67
4,353,274 A * 10/1982 Shimizu ........ 83/156
4,375,759 A * 3/1983 Gentile ........ 72/131
4,555,968 A * 12/1985 Raney et al. ........ 83/209
4,610,650 A * 9/1986 Piggott ........ 493/204
5,154,689 A * 10/1992 Modoux et al. ........ 493/342
5,277,571 A * 1/1994 Brining ........ 425/289
5,373,761 A * 12/1994 Brining ........ 83/13
6,003,420 A * 12/1999 Wakabayashi et al. ........ 83/214
6,128,989 A * 10/2000 Jones et al. ........ 83/156
6,336,406 B1 * 1/2002 Wakabayashi et al. ........ 101/483
2004/0066441 A1 * 4/2004 Jones et al. ........ 347/101
2004/0163515 A1 * 8/2004 Irwin ........ 83/205
2005/0206066 A1 * 9/2005 Bittner et al. ........ 271/9.12
2006/0150795 A1 * 7/2006 Mochizuki et al. ........ 83/669
2007/0107577 A1 * 5/2007 Hattori et al. ........ 83/687
2008/0169601 A1 * 7/2008 Frank et al. ........ 271/183
2009/0183616 A1 * 7/2009 Krauss et al. ........ 83/685

* cited by examiner

FLATBED PUNCHING MODULE FOR PUNCHING A PRINTING MATERIAL AND FLATBED PUNCH

CROSS-REFERENCE TO RELATED APPLICATION

This application claims the priority, under 35 U.S.C. §119, of German Patent Application DE 10 2008 005 214.0, filed Jan. 18, 2008; the prior application is herewith incorporated by reference in its entirety.

BACKGROUND OF THE INVENTION

Field of the Invention

The invention relates to a flatbed punching module for punching a printing material, including an upper platen and a lower platen, which can be moved by a drive relative to the upper platen that is fixed to a frame, in order to perform a punching stroke for punching the printing material passing between the upper platen and the lower platen, so that the lower platen can engage or be thrown onto the upper platen. As a result, the printing material can be processed through the use of at least one punching die. At least one printing material transport device is provided for guiding the printing material. The invention also relates to a flatbed punch.

A very widespread class of flatbed punching modules includes an upper platen which is fixed to the frame and a lower platen which can be moved with respect thereto, for punching a printing material which is situated between the platens, due to the interaction thereof. Both during insertion and during discharge of the printing material to be punched, such as a printing material web which is to be perforated or cut partially, waves can be produced in the printing material. The waves can lead to a material jam above a defined height (the height difference between wave crests and wave troughs). The stability and the speed of the production can be impaired as a result.

Additional printing material guiding elements (passive guides) which are fixed to the frame or can be moved relative to the lower platen, such as by way of a material rocker with a channel-like configuration at the inlet or by way of guide bars which are adhesively bonded on an opposing grooved plate that is received on the lower platen, only react to the symptom which occurs. Therefore, an improvement is required to combat the cause of the problem which occurs, and to compensate for the relative movement between the lower platen and assemblies which are mounted in front of it or behind it.

SUMMARY OF THE INVENTION

It is accordingly an object of the invention to provide a flatbed punching module for punching a printing material and a flatbed punch, which overcome the hereinafore-mentioned disadvantages of the heretofore-known devices of this general type and which provide compensation for a height offset relative to the printing material, wherein the height offset occurs as a result of a cyclically varying punching stroke of a moved lower platen.

With the foregoing and other objects in view there is provided, in accordance with the invention, a flatbed punching module for punching a printing material. The flatbed punching module comprises an upper platen fixed to a frame, a lower platen, at least one punching die, a drive for moving the lower platen relative to the upper platen for performing a punching stroke punching the printing material passing between the upper platen and the lower platen by engaging or throwing the lower platen on the upper platen to process the printing material with the at least one punching die, and at least one printing material transport device held fixedly on the movable lower platen for guiding the printing material, in particular for inserting or for discharging the printing material.

The height offset which occurs is compensated for in the flatbed punching module according to the invention, as a result of which, as an advantageous consequence, a rectilinear introduction of force is made possible during insertion of the printing material. The thrust which occurs in a straight line reduces transverse forces on the punched printing material. As a result, the printing material is more stable and can be accelerated more rapidly. The number of grooves and stamped recesses on the cutting dies have a relatively small influence on the production speed, since the printing material can be pushed in an improved manner from the grooved channels or male dies which are optionally situated on the opposing grooved plate. The printing material can be accelerated more rapidly in the flatbed punching module according to the invention, without the printing material being damaged in the process or the following processing steps being disrupted by waste pieces flying out or loose tabs. In this way, an increase in the production speed can be advantageously achieved.

Setting up times can advantageously also be shortened, since less optimization expenditure is required with regard to the correct type and number of material webs of the printing material.

A connection between a part of the unpunched printing material and a punched part of the printing material (for example, a sheet which is still hanging to a web through a number of material webs) can be provided by way of a small number of material webs. In this way, the punched part can be separated more readily from the printing material which has not yet been punched. The risk is reduced that a printed product or a group of printed products is not severed by a sheet separator in an undesired manner. The punching is less susceptible to a curvature of the printing material (upcurl or downcurl). Fewer material jams are to be expected as an advantageous consequence.

Finally, fewer material webs are necessary in order to stabilize the punched printing material, as a result of which an improved quality of the punched printed products can be achieved.

The lower platen can also be referred to as a punching table. The guidance by the printing material transport device can, in particular, be active and/or be carried out in such a way as to fix the printing material and/or be driven. The printing material can be web shaped. In particular, the printing material can have already been printed, with it being possible for the flatbed punching module to serve for punching individual printed products or groups of printed products, for example folding boxes, from the area of the printing material. More precisely, the punching in the flatbed punching module according to the invention can lead to cutting and/or perforating and/or scoring of the printing module, with the result that the individual printed products or groups of printed products are first of all still connected to one another through material webs before they are stripped in a following step by severing of the remaining material webs.

According to the invention, a flatbed punching module is understood to mean not only a flatbed punching module which can process a printing material by punching, perforating and/or scoring, that is to say it has or can receive dies for cutting, perforating or scoring. A flatbed punching module can also be a flatbed embossing module. In a flatbed embossing module according to the invention, a printing module can be embossed, in particular, or can be finished with film or with relief cut engraving. The film can be applied, in particular, in a hot film embossing process or a cold film embossing process. Relief cut engraving is understood to mean the application of a film, in particular a hot film, with simultaneous embossing. The at least one punching die can, in particular, be a cutting knife, a scoring knife, a female embossing die or a male embossing die.

The printing material can, in particular, be paper, paperboard, cardboard, an organic polymer film or a composite which includes a plurality of materials, for example a material (for example, paper, in particular printed material) which is laminated by polymer film or metal film. The printing material can be made, in particular, of a material other than metal (objects which are composed only of metal, for example of metal sheets, plates or strands), of glass, of semiconductor material or of ceramic.

The at least one printing material transport device can be fastened, in particular, to the lower platen or can be connected fixedly to the lower platen or can be integrated into the lower platen. At least one part of the printing material transport device, for example a receiving element, can also be a part of the lower platen, for example its frame, in embodiments of the flatbed punching module according to the invention.

In accordance with another feature of the invention, in a series of advantageous embodiments of the flatbed punching module according to the invention, the at least one printing material transport device is an intake assembly. The intake assembly serves to feed the printing material to a punching gap which is formed by the upper platen and the lower platen. The position of the moved printing material can be guided, in particular, in a controlled manner. The intake assembly can be driven, in particular. The intake roller can be driven intermittently. In concrete terms, the intake assembly can have a driven intake roller. In advantageous developments of these embodiments, the intake assembly of the flatbed punching module according to the invention includes adjusting rollers which can engage or be thrown onto the intake roller or onto the printing material which wraps partially around the circumferential surface of the intake roller. They can engage or be thrown on pneumatically, for example. Furthermore, the drive of the intake roller can include a servomotor.

In accordance with a further feature of the invention, as an alternative or supplementary to this, the at least one printing material transport device can be a sheet separator in a series of advantageous embodiments of the flatbed punching module according to the invention. A sheet separator serves to separate or completely sever a piece of the printing material which is severed only partially from the printing material apart from individual material webs. In other words, either the at least one printing material transport device can be a sheet separator in a further series of advantageous embodiments of the flatbed punching module according to the invention, or one embodiment of a flatbed punching module according to the invention can also have an intake assembly as a first printing material transport device according to the invention and a sheet separator as a second printing material transport device according to the invention. A sheet separator may also be referred to as a kicker by a person skilled in the art.

In accordance with an added feature of the invention, a transport unit, in particular a sheet transport unit, which is disposed behind or downstream of the flatbed punching module according to the invention, is attached to the sheet separator through a rotatably mounted articulation point. In particular, the transport unit can be disposed immediately behind the flatbed punching module. In particular, the transport unit can be articulated rotatably and in a rotationally mounted manner on the sheet separator and can perform a rocking movement.

Moreover, in accordance with additional or alternative features of the invention, an embodiment of the flatbed punching module according to the invention can have at least the following features individually or in combination with one another:

The lower platen can additionally have fixedly attached printing material elements which make passive guidance of the printing material, in particular, possible. The drive of the lower platen of the flatbed punching module can include one or more connecting rods which are driven by the crankshaft. A web storage apparatus can be disposed in front of the flatbed punching module according to the invention, more precisely its inlet or intake part. In particular, the web storage apparatus can be disposed immediately in front of the flatbed punching module. During the operation of the flatbed punching module, a web storage apparatus serves to temporarily receive a continuously fed printing material web which is fed to the flatbed punching module in an intermittent movement.

In advantageous developments, the web storage apparatus can include a pivotably mounted web storage reel. Furthermore or as an alternative to this, the web storage apparatus can have a servomotor for performing the pivoting movement of the web storage reel, or the web storage reel can be connected to the drive of the lower platen through the use of a mechanical gear mechanism in order to perform the pivoting movement, or the web storage reel can be mounted eccentrically.

With the objects of the invention in view, there is concomitantly provided a flatbed punch for processing a printing material, in particular a reinforced cardboard web. The flatbed punch according to the invention comprises at least one web inlet part, a transport unit, in particular a sheet transport unit, a stripper unit, a tab separating unit and a product delivery. The flatbed punch according to the invention is distinguished by the fact that it includes at least one flatbed punching module having features or combinations of features according to the invention.

Other features which are considered as characteristic for the invention are set forth in the appended claims.

Although the invention is illustrated and described herein as embodied in a flatbed punching module for punching a printing material and a flatbed punch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
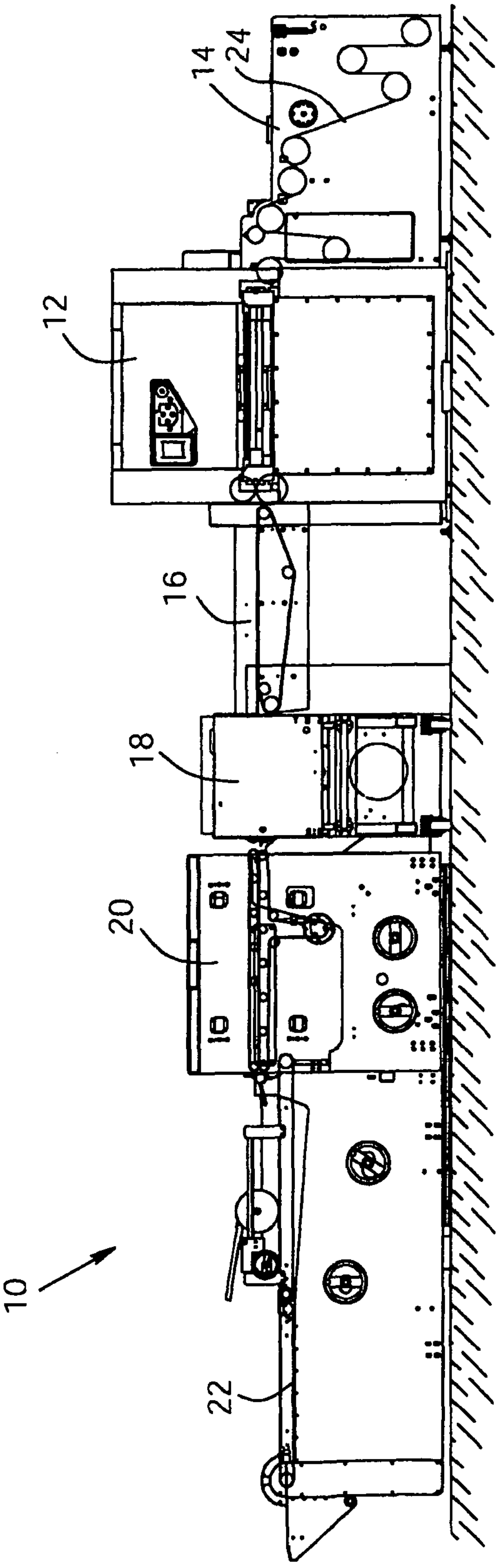
FIG. 1 is a diagrammatic, longitudinal-sectional view of a flatbed punch according to the invention having a flatbed punching module according to the invention.

Referring now to the figures of the drawings in detail and first, particularly, to FIG. 1 thereof, there is seen a diagrammatic view of a flatbed punch 10 according to the invention, having a flatbed punching module 12 according to the invention. The illustrated embodiment of the flatbed punch 10 has a modular construction in a horizontal configuration. In this embodiment, a printing material web, for example folding boxes which are printed on a reinforced cardboard web, are processed by the modules from right to left as follows: a printing material web 24 coming from a web inlet part 14 passes into the flatbed punching module 12, in which the printing material web 24 is cut in such a way that, in following processing steps, firstly individual sheets can be severed from the printing material web 24 and secondly individual printed products are stripped from the printing material web 24 and can be separated from one another. The separation into individual sheets takes place as early as at an outlet of the flatbed punching module 12. The severed sheets pass through a transport unit 16 which is disposed behind the flatbed punching module 12 into a stripper unit 18 and a tab separating unit 20, in which units the printed products are severed from the trimmed parts and are separated. The printed products are then delivered in a product delivery 22.

Figure 2:
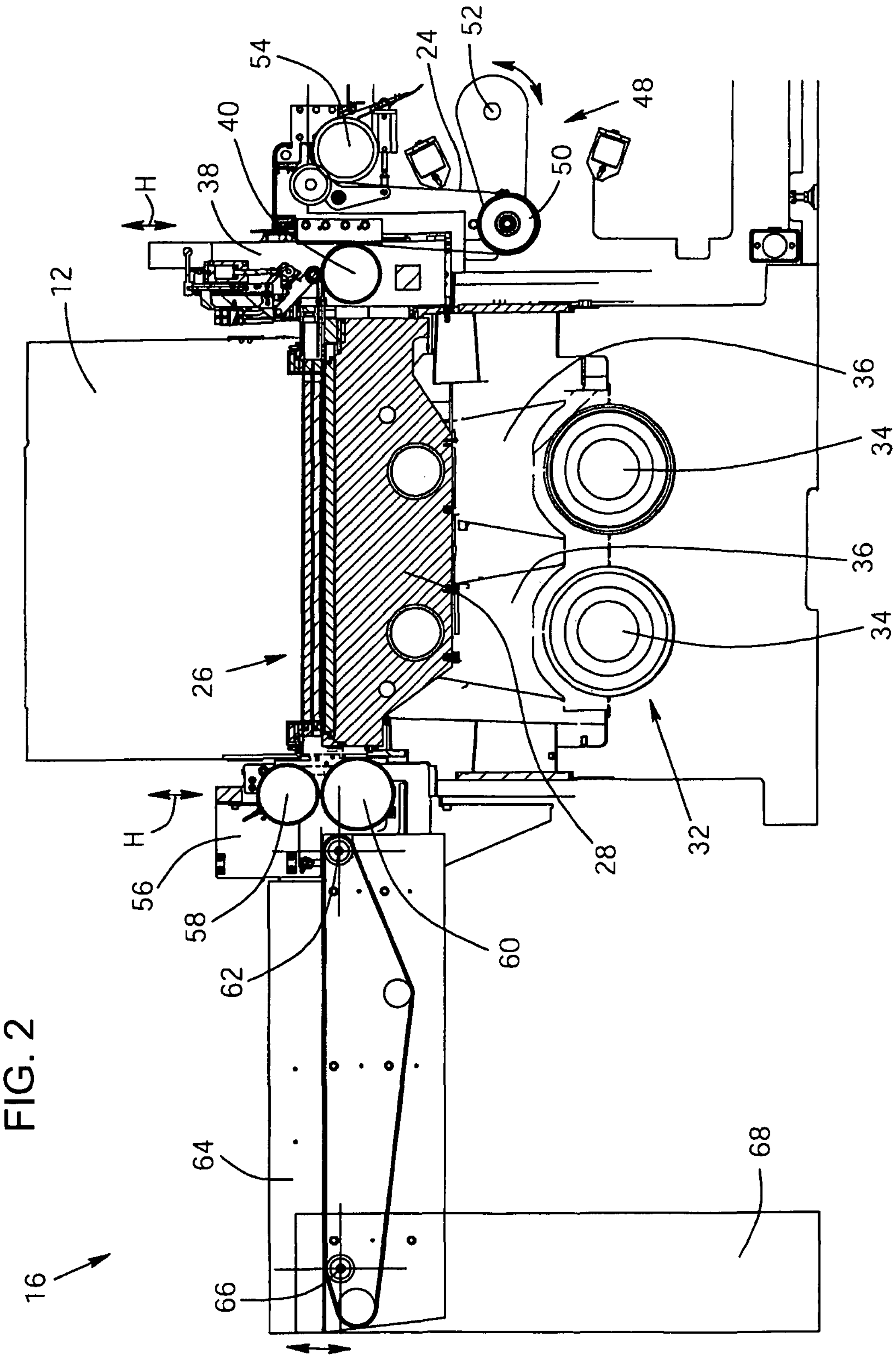
FIG. 2 is an enlarged, longitudinal-sectional view of an advantageous embodiment of the flatbed punching module according to the invention having an intake assembly which is received fixedly on a lower platen and a fixedly received sheet separator.

FIG. 2 is a sectional view of an advantageous embodiment of the flatbed punching module 12 according to the invention, having at least one printing material transport device in the form of an intake assembly 38 received fixedly on a movable lower platen 28 and a fixedly received sheet separator 56. Furthermore, the transport unit 16 is shown as being disposed immediately behind the flatbed punching module 12 in the left hand part of the illustration of FIG. 2. The flatbed punching module 12 includes an upper platen 26 which is fixed to the frame or is immovable. The upper platen 26, in interaction with the movable lower platen 28, can punch the printing material web 24 which is situated between the upper platen 26 and the lower platen 28. The lower platen 28 (which can also be referred to as a punching table) can perform a cyclical or oscillating punching stroke H by way of a drive 32. In this embodiment, the stroke H is carried out through the use of two crankshafts 34 and four connecting rods 36, of which two are concealed in the view of FIG. 2. The punching stroke H is typically approximately 20 mm.

Firstly, the intake assembly 38 (see FIG. 3 as well in this regard) is received fixedly on the lower platen 28. The intake assembly 38 performs the punching stroke H with the lower platen 28. The intake assembly 38 includes an intermittently driven intake roller 40. The intermittent movement can also be referred to as a start/stop movement. The movement profile can have a rest phase during the actual punching operation, which is the pressing of the lower platen 28 against the upper platen 26. A web storage device 48 is mounted immediately in front of the intake assembly 38 of the flatbed punching module 12 along the path of the printing material web 24. The web storage device 48 includes a web storage reel 50 which can also be referred to as a guide reel. The web storage reel 50, which is driven in an oscillating manner by a servomotor, is received in the web inlet part 14 of the flatbed punch 10 (see FIG. 1) in such a way that it can be pivoted about a pivot point 52. A pulling assembly 54 for the printing material web 24, which is driven continuously by a servomotor, is mounted immediately in front of the web storage device 48 along the path of the printing material web 24.

Secondly, the sheet separator 56 is received fixedly on the lower platen 28. The sheet separator 56 also performs the punching stroke H with the lower platen 28. Due to an interaction between an upper roll 58 and a lower roll 60, punched sheets which have not yet been severed completely from the printing material web 24 are gripped and accelerated in such a way that the material webs which remain after the punching break and the severed sheets can be transported further in a separated manner. A transport belt frame 64 can be pivoted through an articulation point 62 (which at the same time is a linear guide) of the sheet separator 56 about a rotational point 66 which is situated in a fixed frame 68 of the transport unit 16. If the sheet separator 56 moves up and down according to the punching stroke H, the transport belt frame 64 performs a rocking movement.

Figure 3:
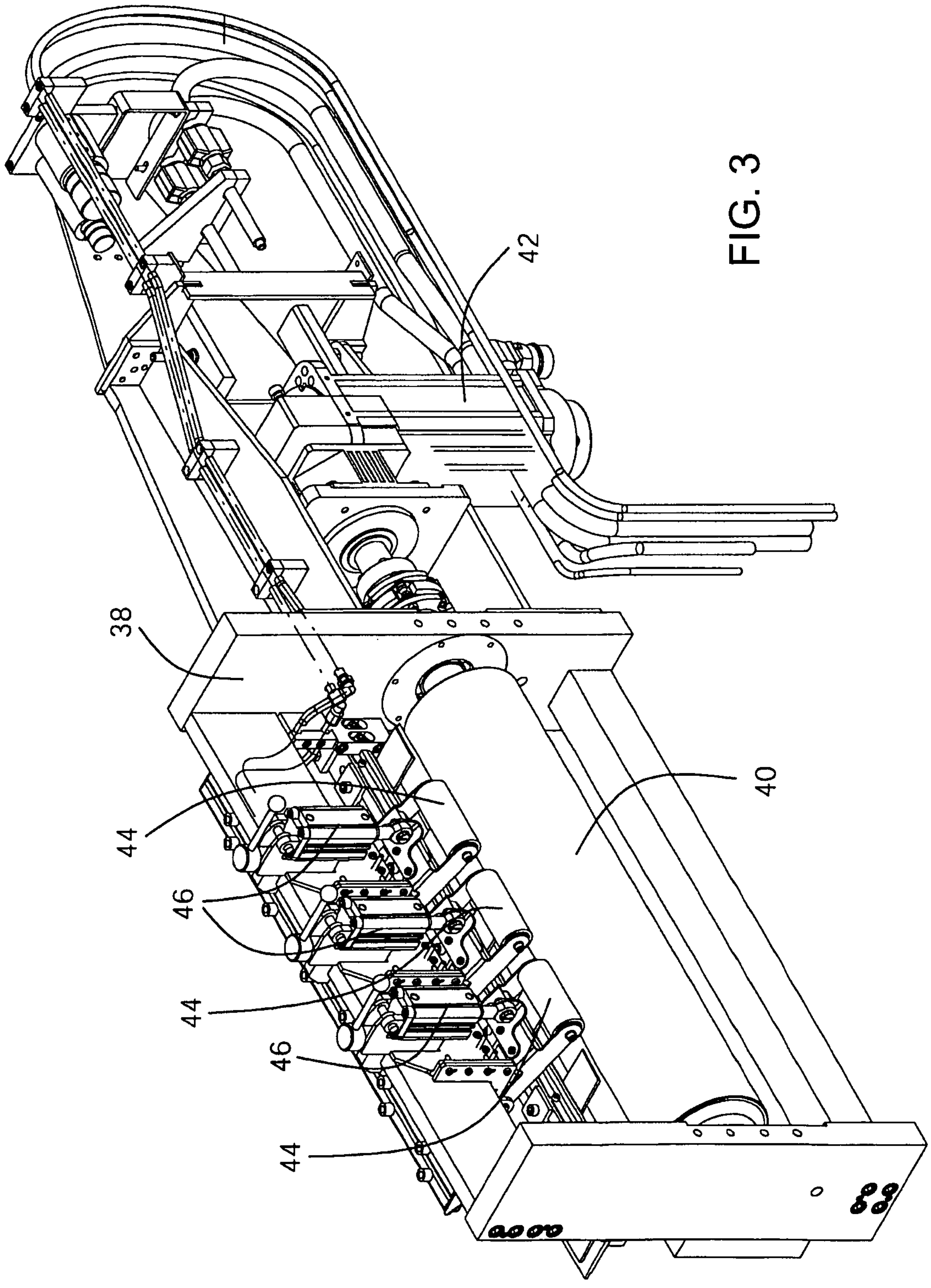
FIG. 3 is a perspective view of the intake assembly in the advantageous embodiment shown in FIG. 2.

FIG. 3 provides a detailed illustration of the intake assembly 38, which oscillates with the punching stroke H in the vertical direction, in the advantageous embodiment which is shown in FIG. 2. In this illustration, first of all the intake roller 40 which is driven by a servomotor 42 can be seen. Adjusting rollers 44 which, by way of example, are three individual adjusting rollers 44 in this case, can engage or be thrown onto the printing material web 24 (not shown in FIG. 3) which extends over the intake roller 40, in order to fix the position of the printing material web 24. The adjusting rollers 44 can be actuated by way of pneumatic cylinders 46 for engaging and disengaging or throwing on and off. That surface of the adjusting rollers 44 which makes contact with the printing material web is minimized as far as possible for different reasons. For example, damage of the printed image which is situated on the printing material web can be avoided in this way. An embossed image which might be present should also not be pressed flat in this case. As low a mass or inertia as possible is also advantageous because of the highly dynamic intermittent movement which is to be carried out. The servomotor 42, the adjusting rollers 44 and the pneumatic cylinders 46 move cyclically with the entire intake assembly 38 which is fastened to the lower platen 28.

The invention claimed is:

1. In a flatbed punch having a frame, a flatbed punching module for punching pliant web-shaped printing material, the flatbed punching module comprising:

an upper platen fixed to the frame;

a lower platen;

said upper platen and said lower platen forming a punching gap therebetween;

at least one punching die;

a drive for moving said lower platen relative to said upper platen for performing a punching stroke punching the web-shaped printing material passing between said upper platen and said lower platen by engaging said lower platen with said upper platen to process the web-shaped printing material with said at least one punching die; and at least one printing material transport device held fixedly on said movable lower platen, said at least one printing material transport device being an intake assembly disposed upstream of said lower platen in a web feed direction and configured to feed the pilant web-shaped printing material to said punching gap and said intake assembly having a driven intake roller.

2. The flatbed punching module according to claim 1, wherein said intake assembly includes adjusting rollers to be engaged with said intake roller.

3. The flatbed punching module according to claim 1, which further comprises a drive including a servomotor for said intake roller.

4. The flatbed punching module according to claim 1, wherein said at least one printing material transport device is a sheet separator.

5. The flatbed punching module according to claim 4, which further comprises a transport unit disposed downstream of the flatbed punching module and attached to said sheet separator through a rotatably mounted articulation point.

6. The flatbed punching module according to claim 4, wherein the transport unit is mounted rotatably on an outlet side in a stationary frame.

7. The flatbed punching module according to claim 1, wherein said drive for said lower platen includes a connecting rod driven by a crankshaft.

8. The flatbed punching module according to claim 1, which further comprises a web storage apparatus disposed upstream of the flatbed punching module.

9. The flatbed punching module according to claim 8, wherein the web storage apparatus includes a pivotably mounted web storage roller.

10. The flatbed punching module according to claim 9, wherein said web storage apparatus has a servomotor for performing a pivoting movement of the web storage roller.

11. The flatbed punching module according to claim 8, wherein said web storage roller is connected to said drive of said lower platen by a mechanical gear mechanism in order to perform a pivoting movement.

12. The flatbed punching module according to claim 8, wherein said web storage roller is mounted eccentrically.

13. The flatbed punching module according to claim 1, wherein said driven intake roller is driven intermittently.

14. The flatbed punching module according to claim 1, wherein said adjusting rollers can engage or be thrown onto said intake roller or the printing material pneumatically.

15. The flatbed punching module according to claim 1, wherein said driven intake roller, of said intake assembly of said at least one printing material transport device held fixedly on said movable lower platen, is fixed to and moves with said lower platen.

16. The flatbed punching module according to claim 1, wherein said driven intake roller, of said intake assembly disposed upstream of said lower platen in said web feed direction, is disposed upstream of said at least one punching die disposed between said upper platen and said lower platen.

17. A flatbed punch for processing a printing material web, the flatbed punch comprising:

at least one web inlet part;

at least one flatbed punching module according to claim 1;

a transport unit;

a stripper unit;

a tab separating unit; and a product delivery.

* * * * *

UNITED STATES PATENT AND TRADEMARK OFFICE

CERTIFICATE OF CORRECTION

PATENT NO. : 8,408,110 B2
APPLICATION NO. : 12/354941
DATED : April 2, 2013
INVENTOR(S) : Joachim Krauss et al.

It is certified that error appears in the above-identified patent and that said Letters Patent is hereby corrected as shown below:

Title Page, Item [73] Assignee should read as follows:

Gallus Stanz - und Druckmaschinen GmbH, Weiden (DE)

Signed and Sealed this
Twentieth Day of August, 2013

Teresa Stanek Rea
*Acting Director of the United States Patent and Trademark Office*